J. E. THOMPSON.
PLOW.
APPLICATION FILED JAN. 12, 1910.

957,272.

Patented May 10, 1910.

UNITED STATES PATENT OFFICE.

JAMES E. THOMPSON, OF TROY, ALABAMA, ASSIGNOR OF ONE-HALF TO W. R. WHITE, OF TROY, ALABAMA.

PLOW.

957,272.  Specification of Letters Patent.  Patented May 10, 1910.

Application filed January 12, 1910. Serial No. 537,758.

*To all whom it may concern:*

Be it known that I, JAMES E. THOMPSON, a citizen of the United States of America, and a resident of Troy, county of Pike, State of Alabama, have invented certain new and useful Improvements in Plows, of which the following is a full and clear specification, reference being had to the accompanying drawings, in which—

Figure 1:
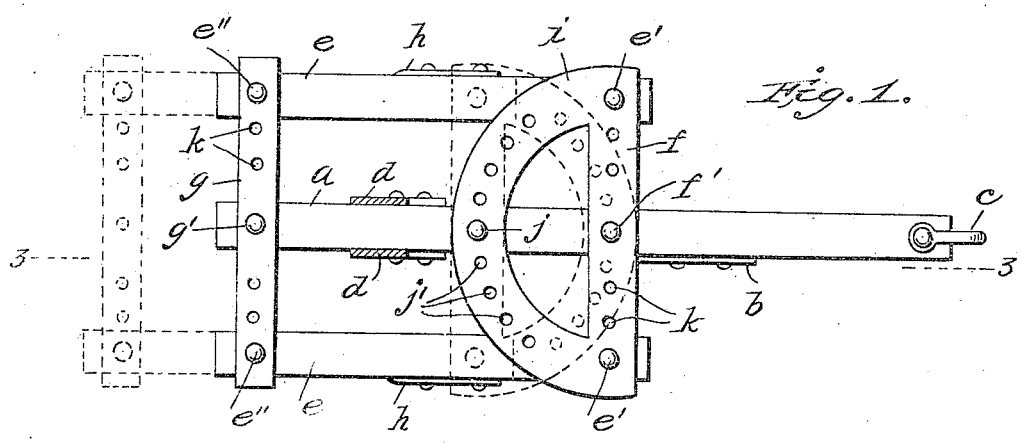
Figure 2:
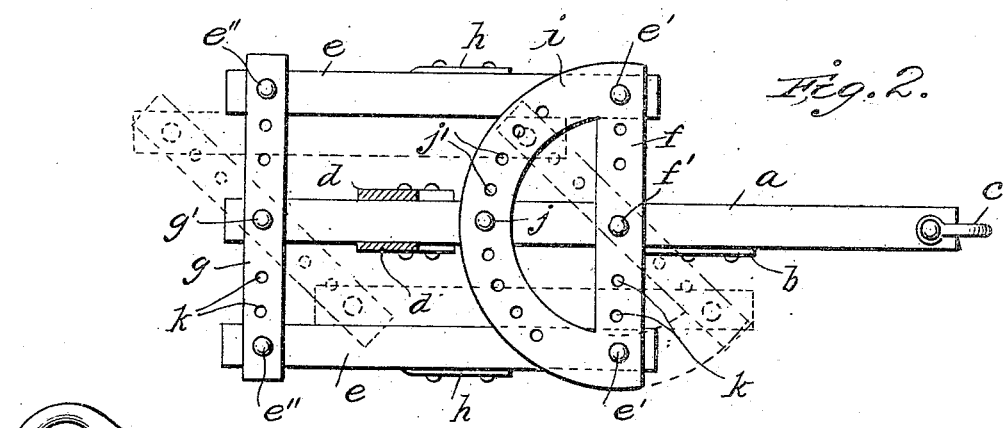
Figure 3:
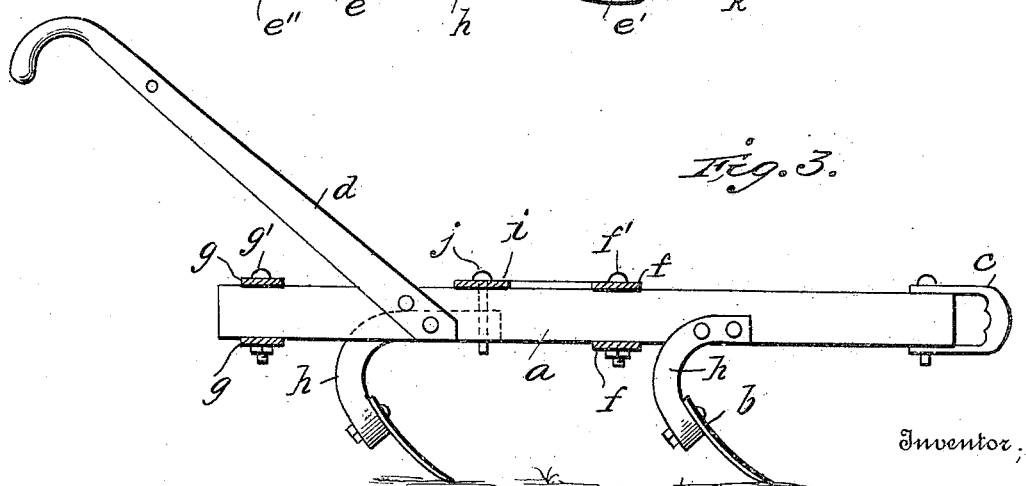

Figure 1 is a plan view of my improved plow, showing in dotted lines one of the adjustments of which the plow is capable; Fig. 2 is a similar view showing another of the adjustments of which the plow is capable; and Fig. 3 a longitudinal section on the line 3—3 of Fig. 1.

The object of this invention is to provide a cultivator which shall be extremely simple in construction and which shall be capable of practically universal adjustment to adapt it to various kinds of work.

Referring to the drawings by reference letters, $a$ designates a central beam to which is attached the central or forward plow $b$ and to whose forward end is attached a clevis $c$ and to whose rear end the handles $d$ are attached.

$e$ designates a pair of side beams shorter than the central beam and supported therefrom by a front pair of cross-bars $f$ and a rear pair of cross-bars $g$ clamped, respectively, on the upper and lower faces of the beams. The front pair of bars $f$ is pivotally clamped to the central beam by a vertical bolt $f'$ and to the side beams by vertical pivotal bolts $e'$. The rear bars $g$ are pivotally clamped to the central beam by a vertical bolt $g'$ and to the side beams by vertical pivot bolts $e''$.

Each of the side beams carries a plow-standard $h$ which, like the plow-standard $b$, is adapted to receive a soil-working implement suitable to the character of work to be performed. Carried by the top cross-bar $f$ is a semi-circular bar $i$ which curves rearwardly from the rear edge of said bar $f$ and crosses the central beam on top thereof. A vertical locking bolt or pin $j$ is passed down through a hole in this cross-bar $i$ and into the central beam to lock the cross-bar to the beam, and on either side of this lock-pin $j$ this curved cross-bar $i$ is provided with extra holes $j'$. The cross-bars $f$ and $g$ are also provided with extra series of holes $k$. By means of these extra holes $k$ the side beams $e$ may be bodily adjusted inwardly and outwardly to narrow or widen the implement, and by means of the series of holes in the curved cross-bar the implement may be converted into a right-hand or a left-hand cultivator by setting the cross-bars obliquely in either direction with reference to the central beam, as shown in dotted lines in Fig. 2. In adjusting the cultivator for right or left hand work it will be observed that the side beams are maintained in all adjustments parallel with the central beam. By these various adjustments the cultivator may be adapted to various kinds of work, and by changing the soil-working devices on the plow-standards the cultivator may be adapted to practically all kinds of cultivating work.

It will be observed that the segment $i$ lies in the same plane as the bar $f$ to which it is attached and that it extends clear to the ends of said bar; the result of this construction is that the widest possible range of adjustment is secured (which is very essential in adapting the device to various kinds of work) and furthermore the side beams are given a broad bearing against the underside of the segment, thus contributing to strength and durability and relieving the fastening bolts of strain. It will also be observed that the bolts $f'$, $g'$, and $j$ are removable, whereby both side beams and the cross bars may be readily removed to convert the implement into a single-stock plow. Furthermore, the removability of the bolts enables the two side beams to be adjusted backwardly, as shown in dotted lines in Fig. 1, by removing the bolt $g'$ and by reversing the segment carrying bar $f$, as shown in said figure, this reversal or turning over of the segment bar causing the segment to project forwardly from the bar instead of rearwardly as shown in full lines in Fig. 1 and bringing the front bar $f$ backwardly a distance equal to the distance between the two bolts $f'$ and $j$. This bodily rearward adjustment of the side beams brings the plows thereon at a greater distance back of the plow on the central beam, this being highly desirable in certain kinds of work. In this adjustment of the side beams, it will be observed that the rear bars $g$ do not connect with the central beam but do connect and mutually brace the two side beams at a point back of the central beam. This bracing of the side beams at a point back of the central beam is advantageous in that it prevents lateral springing of the side beams from springing the beams out of line while in operation in heavy work. It will be observed that it is advantageous to permit this adjustment of the side beams to have the handles attached to the central beam at a point between the segment $i$ and the rear bars $g$, as in that position the handles will not interfere with the adjustment of the bars.

It will be observed that I provide means whereby the two side plows $h$ shall have practically a universal adjustment with respect to the central plow. The usual adjustment may be said to be that which is shown in full lines in Figs. 1 and 2, in which the side beams are adjusted to the farthest points outwardly from the central beam and the side plows are a little in front of the central plow. From this position either side beam may be bodily adjusted inwardly toward the central beam, and by swinging the cross bars on their central pivots $g'$ and $f'$ either side beam may be set forward of the other side beam, as shown in Fig. 2 in dotted lines, thus bringing the plows substantially in alinement completely with either one of the side beams in front. Then by reversing the segment-carrying cross bar and shifting the back cross bars, both side beams may be bodily shifted backwardly far enough to bring the side plows back of the central plow. It will thus be observed that I provide for all the adjustments of the plows that may be needed to perform the various kinds of work possible to perform with this type of plow or cultivator.

A special advantage in adjusting the side plows both back of the central plows is that in breaking the soil the straight shovel or scooter plow can be used on the center foot and right and left hand turners respectively on the side feet, whereby a center furrow with a complete list can be made at one going, thereby greatly saving in time and breaking the ground uniformly and thoroughly.

Having thus fully described my invention, what I claim as new, and desire to secure by Letters Patent, is—

In a cultivator or plow, the combination of a central beam carrying a plow standard, two side beams each carrying a plow standard located forward of the central plow standard, cross bars extending across the beams and means for pivotally and detachably connecting them together at their points of intersection, the front cross-bar being provided with a segment projecting rearwardly from its rear edge and crossing the central beam, means for detachably and adjustably attaching this segment to the central beam at the point of intersection therewith, said front cross bar together with its segment being adapted to be reversed or turned over and said rear cross bar being adapted to be detached from the central beam and set back to bring the side plows back of the central plow.

In testimony whereof I hereunto affix my signature in the presence of two witnesses this 10th day of January 1910.

JAMES E. THOMPSON.

Witnesses:
 ROBT. P. TUCKER,
 G. F. DICKINSON.